United States Patent [19]

Onishi et al.

[11] 4,234,896
[45] Nov. 18, 1980

[54] PCM RECORDING AND REPRODUCING SYSTEM

[75] Inventors: Ken Onishi; Kunimaro Tanaka, both of Amagasaki, Japan

[73] Assignee: Mitsubishi Denki Kabushiki Kaisha, Tokyo, Japan

[21] Appl. No.: 959,774

[22] Filed: Nov. 13, 1978

[51] Int. Cl.³ .................. G11B 5/00; G11B 5/09; G11B 27/02; H04W 5/78

[52] U.S. Cl. ................................. 360/32; 360/14; 360/38

[58] Field of Search ............... 360/13, 14, 27, 61, 360/38, 32; 340/146.1 BE

[56] References Cited

U.S. PATENT DOCUMENTS

| | | | |
|---|---|---|---|
| 3,050,105 | 8/1962 | Dolby | 360/13 |
| 4,063,284 | 12/1977 | Tatami | 360/38 |
| 4,143,406 | 3/1979 | Tsuiki et al. | 360/40 |
| 4,146,099 | 3/1979 | Matsushima et al. | 360/38 |

Primary Examiner—Vincent P. Canney
Attorney, Agent, or Firm—Wenderoth, Lind & Ponack

[57] ABSTRACT

A reproduced PCM signal in the form of continuous frames is subjected to a code check after the separation of its frame synchronizing signals and then stored in a memory. If more than two consecutive frames are determined to include code errors resulting from a spliced portion of the associated PCM magnetic tape then those frames are prevented from being written into the memory but the latter is continuously read out by skipping the lost data and reading other data stored in the memory. Also the amount of data stored in the memory is sensed and maintained at a predetermined constant magnitude by controlling the speed of travel of the tape.

7 Claims, 9 Drawing Figures

PCM RECORDING AND REPRODUCING SYSTEM

BACKGROUND OF THE INVENTION

This invention relates to improvements in a PCM recording and reproducing system and more particularly to means for smoothing the noise from the loss of digital signals that may occur resulting from the splice editing of a PCM magnetic record tape.

PCM recording and reproducing systems are already well known in the field of the digital recording technique. Among them, PCM recording and reproducing systems utilizing magnetic record tape and including multi-track type stationary recording and reproducing heads are advantageous in that the mechanism is not only simple but also splice editing is possible. Particularly, PCM recording and reproducing systems for sound signals indispensably require editing of the magnetic record tape and are especially advantageous in that the splice editing can be performed with a single recorder.

Splice editing involves cutting the magnetic record tape in order to remove an unnecessary portion thereof or to insert a required tape portion and splicing the tape portions into a single tape by applying short lengths of a splicing tape to the tape portions to be joined. However, upon reproducing digital signals recorded on the spliced tape portion, some of them will be lost for the following reasons. The cutting of the magnetic record tape causes the deterioration of the record on that portion of the tape adjacent to the cut end thereof. When the cut end portions of the tape are spliced to each other, the splice angle with the longitudinal axis of the tape may deviate from a predetermined splice angle, a mismatch may occur in the joint of the tape portions, the splicing tape may extend and so on. Also during the travel of the tape the spliced portion thereof may touch the associated head in a manner ineffective for good recording or reproduction. Even with splice editing effected by using a jig, it is impossible to fully eliminate this loss of the digital signals. The manual splice usually utilized results in the loss of the reproduced signal for a few milliseconds. This means that several thousand bits will be lost assuming that the recording speed is on the order of 1 megabits per second. This figure is very large as compared with scores of bits usually lost resulting from flaws and scratches on and dust adhering to the magnetic record tape. Therefore conventional compensation methods for the loss of reproduced signals are not effective. As a result, conventional PCM recording and reproducing systems have been disadvantageous in that noise is generated upon converting a reproduced digital signal to the original analog signal and the resulting signal quality is much impaired particularly for sound signals.

Accordingly, it is an object of the present invention to provide a new and improved PCM recording and reproducing system free from the noise of reproduced digital signals due to the splice editing of the PCM record medium by smoothing the loss of digital signals lost upon reproduction of the spliced tape portion with other digital signals stored in a memory and reproduced with a predetermined delay time.

It is another object of the present invention to provide a new and improved PCM recording and reproducing system for continuously reproducing an output signal from the PCM record medium involved by smoothing the noise from the loss of reproduced signals resulting from the splice editing of the PCM record medium.

It is still another object of the present invention to effectively perform the splice editing of PCM magnetic record tapes.

SUMMARY OF THE INVENTION

The present invention provides a PCM recording and reproducing system for recording a PCM signal converted from an analog signal in a predetermined pattern on a plurality of record tracks disposed on a PCM record medium and reproducing the PCM signal from the PCM record medium, comprising, a memory means having a predetermined capacity to store the reproduced PCM signal as data therein, a reading means for reading the data out from the memory means with a time delay, a first sensor means for sensing a spliced portion of the record medium to produce a splice sensing signal, and a writing suspension means responsive to the splice sensing signal to suspend the writing of the data in said memory means.

Preferably, a second sensor means may be operatively coupled to the first sensor means to sense the amount of data stored in the memory means and also connected to a control means for controlling the amount of data stored in the memory means to a predetermined constant amount by controlling the speed of travel of the record medium.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

In PCM recording and reproducing systems employing stationary recording and reproducing heads, an audio signal in analog form is digitalized into a corresponding digital signal. Then a predetermined number of samples of the digital signal are formed into a frame with a frame synchronizing signal disposed before the foremost sample and a check signal disposed after the rearmost sample. This is repeated to form frames one after another. Usually, the digital signal is in the binary form, the frame synchronizing signal is formed of a predetermined number of bits and each frame includes several samples formed of data bits. For example, the check signal or bits may be preferably formed of a CRCC (which is the abbreviation for "Cyclic Redundancy Check Character") code having a high ability to sense burst errors by check bits.

Figure 1:
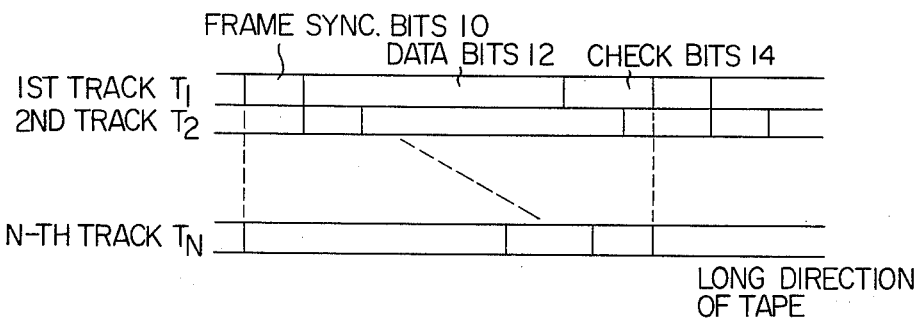
FIG. 1 is a schematic diagram of one portion of a signal pattern recorded on a PCM magnetic record tape in accordance with a conventional frame distribution technique.

The frames thus formed are recorded in a predetermined pattern on a plurality of record tracks disposed on a PCM magnetic record tape. FIG. 1 shows, by way of example, some frames distributed among N record tracks $T_1, T_2, \ldots, T_N$ disposed on a PCM magnetic record tape in accordance with a conventional frame distribution technique and recorded thereon. As shown in FIG. 1, the plurality of record tracks $T_1, T_2, \ldots T_N$ run in a parallel relationship to the longitude of the record tape contacting one another and each frame includes frame synchronizing bits 10 followed by data bits 12 and check bits 14 located at the end thereof. A first one of the frames is recorded on the uppermost track $T_1$ of the tape as viewed in FIG. 1 and a second one of the frames is recorded on a second track $T_2$ immediately under the uppermost track $T_1$ as viewed on the width of the tape with a time delay equal to the duration of the frame synchronizing bits 10 and so on until the N-th frame is recorded on the lowermost track $T_N$ as viewed in FIG. 1.

Thereafter the (N+1)th frame is recorded on the uppermost track $T_1$ so as to be contiguous with the check bits 14 of the first frame. Then the process as above described is repeated to record successively and repeatedly the frames on the tracks $T_1, T_2, \ldots, T_N$ with incremental time delays equal to the duration of the frame synchronizing bits.

In this way, the digital signal is subjected to the speed conversion so as to be recorded on the PCM multi-track tape as a low speed PCM signal.

Figure 2:
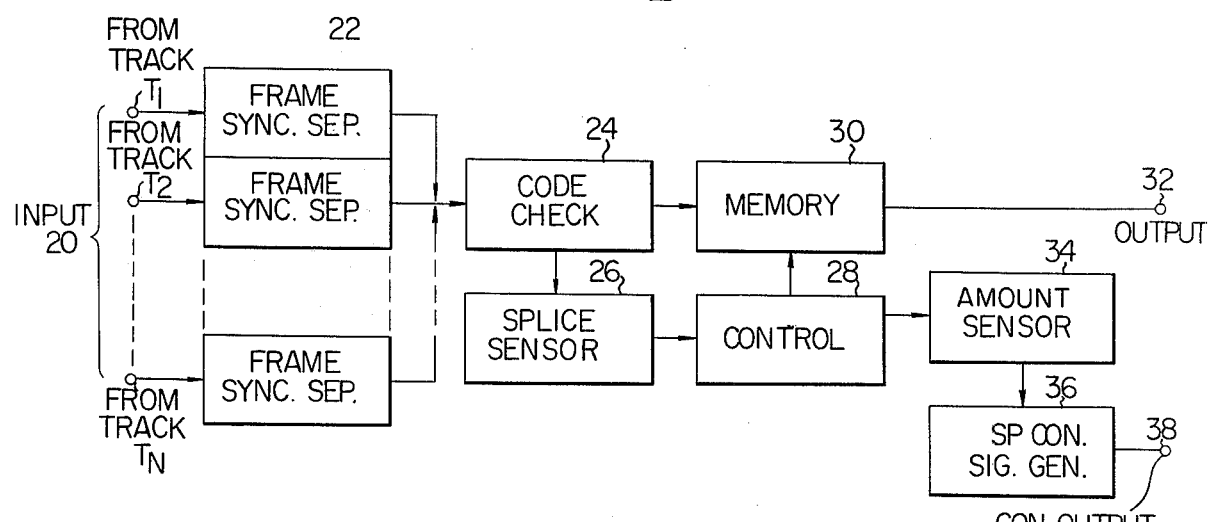
FIG. 2 is a block diagram of one embodiment of the essential portion of the PCM recording and reproducing system of the present invention.

Referring now to FIG. 2, there is illustrated one embodiment of the present invention wherein a digital signal, in this case in a binary form reproduced from a PCM magnetic record tape such as shown in FIG. 1, is processed so that the reproduced signal is continuously delivered by smoothing the noise of a lost portion of the reproduced digital signal resulting from a spliced portion of the record tape with another portion of the digital signal with the speed of travel of the tape controlled. The arrangement illustrated comprises a plurality of input terminals 20 one for each track disposed on the PCM magnetic record tape and one frame synchronizing pulse separator circuit 22 connected to each input terminal 20. All the frame synchronizing pulse separator circuits 22 are connected to a code check circuit 24 that is, in turn, connected to a splice sensor circuit 26 which is connected to a control circuit 28. The code check circuit 24 is further connected to a memory 30 which in turn is connected to an output terminal 32. The control circuit 28 is connected to the memory 30 and also to an amount sensor circuit 34. The amount sensor circuit 34 is connected to a speed control signal generator circuit 36 which in turn is connected to a control output terminal 38.

In operation, the frames reproduced from the associated tracks $T_1, T_2, \ldots, T_N$ on the PCM magnetic record tape are applied in a parallel relationship with the incremental delay times to the input terminals 20 and then to the frame synchronizing pulse separator circuits 22 respectively. The frame synchronizing pulse separator circuits 22 separate the frame synchronizinging signals 10 in the form of bits (see FIG. 1) from the associated reproduced frames to leave the remaining portions of the reproduced frames arranged in a parallel form with incremental delay times. Then those remaining frame portions are subjected to speed conversion to form a series signal from each set of the frames adjacent to one another widthwise on the PCM magnetic record tape. The series signals thus formed one after another are delivered to the code checks circuit 24 which check if the data bits included in each reproduced frame are erroneous. One output from the code check circuit 24 is applied to the memory 30 and is normally written therein and another output is applied to the splice sensor circuit 26. The splice sensor circuit 26 senses the presence or the absence of splice editing in the output from the code check circuit 24.

If the splice sensor circuit 26 senses the presence of splice editing then this circuit supplies a splice sensing signal to the control circuit 28. Upon reception of a splice sensing signal, the control circuit 28 is operated to prevent the memory 30 from writing therein the output from the code check circuit 24. The memory 30 is continuously prevented from writing that output therein while the PCM magnetic record tape is traveling until the splice sensing signal disappears. Thereafter the data passed through the code check circuit 24 are again written in the memory 30.

On the other hand, the memory 30 is continuously read out, and the data read out from the memory 30 is delivered to the output terminal 32. The amount sensor circuit 34 is responsive to an output from the control circuit 28 to sense the amount of data stored in the memory 30 to cause the speed control generator circuit 36 to generate a speed control signal which is, in turn, supplied via the control output terminal 38 to a speed control circuit (not shown) for controlling the speed of travel of the PCM magnetic record tape.

The circuits 26 through 38 will now be described in more detail in connection with the operation thereof.

Figure 3:
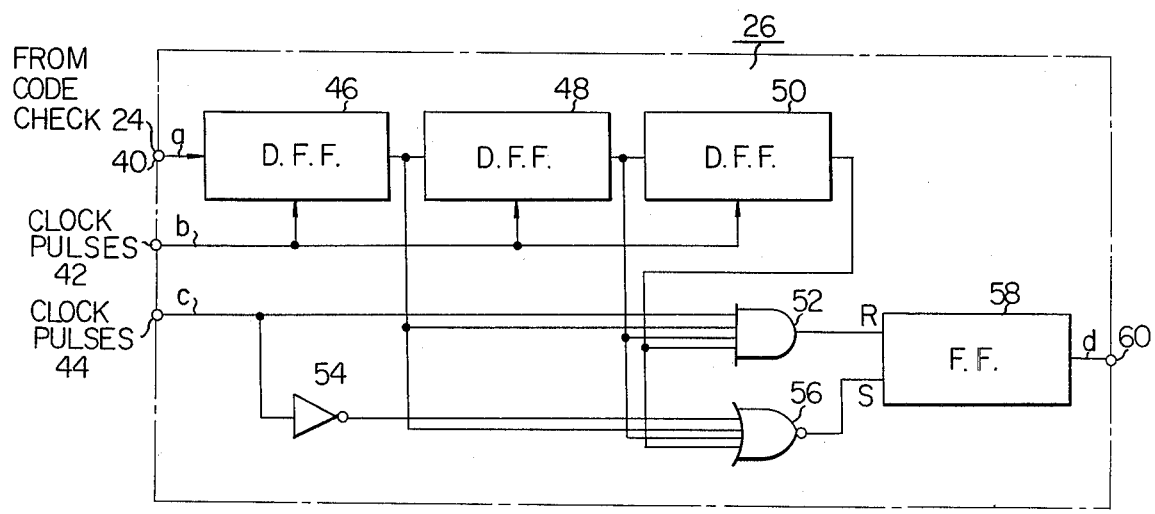
FIG. 3 is a circuit diagram of the details of the splice sensor circuit shown in FIG. 2.

The splice sensor circuit 26 serves as first sensor means and can have the circuit configuration shown in FIG. 3. The arrangement illustrated includes three inputs 40, 42 and 44. The input 40 is connected to a first one of three serially connected "D FLIP-FLOP" circuits 46, 48 and 50, the input 42 is connected to all the three "D FLIP-FLOP" circuits 46, 48 and 50, and the remaining input 44 is connected to a first input of an "AND" gate 52 including a second, a third, and a fourth input connected to outputs of the "D FLIP-FLOP" circuits 46, 48 and 50 respectively. The input 44 is also connected via an inverter 54 to a first input to a "NOR" gate 62 while the outputs of the "D FLIP-FLOP" circuits 46, 48 and 50 are connected to the second, the third and the fourth input of the "NOR" gate 56, respectively. The "AND" gate 52 and the "NOR" gate 56 respectively are connected to the pair of inputs R and S of an "R-S FLIP-FLOP" circuit 58 which in turn is connected to an output 60.

Figure 4:
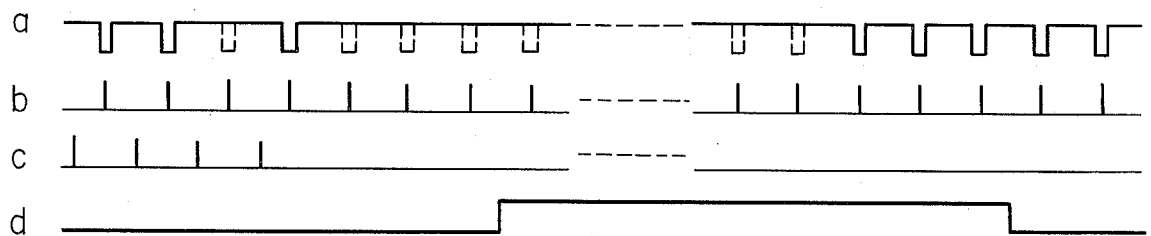
FIG. 4, consisting of a–d, is a graph illustrating signal waveforms developed at various points in the arrangement shown in FIG. 3.

The operation of the arrangement shown in FIG. 3 will now be described with reference to FIG. 4 which illustrates signal waveforms developed at various points in the arrangement of FIG. 3. The output from the code check circuit 24 which is a series of negatively going error check pulses a (see waveform a, FIG. 4) is applied through the input 40 to the first "D FLIP-FLOP" circuit 46. Simultaneously a train of clock pulses b (see waveform b, FIG. 4) is applied via the second input 42 to all the "D FLIP-FLOP" circuits 46, 48 and 50. As seen in FIG. 4, the error check pulses a are equal in pulse repetition period to and synchronized with the clock pulses b and each of the error check pulses a is successively passed through the three "D FLIP-FLOP" circuits 46, 48 and 50 in response to the corresponding clock pulses b so that each time the pulse a is passed through a different one of the "D FLIP-FLOP" circuit it is delayed by one pulse repetition period of the clock pulses b. Therefore the error check pulses a appearing at the outputs of the "D FLIP-FLOP" circuits 46, 48 and 50 have time delays equal to one, two and three times the pulse repetition period of the clock pulses b.

Further, another train of clock pulses c (see waveform c, FIG. 4) is applied to the "AND" gate 52 while it is also inverted in polarity by the inverter 54 and then applied to the "NOR" gate 56. As seen in FIG. 4, the clock pulses c are equal in pulse repetition period to the clock pulses b and appear midway between the adjacent clock pulses b.

In FIG. 4 more than three error check pulses a are shown by dotted lines to indicate that data bits continuously include errors. In the splice sensor circuit 26 shown in FIG. 2, at least three consecutive error check pulses a have indicated the occurrence of errors. In other words, it has been sensed that the series signal delivered from the frame synchronizing pulse separator circuits 22 includes at least three consecutive erroneous frames. This means that in the frame distribution pattern as shown in FIG. 1, errors have been developed in the data resulting from at least three tracks adjacent to one another widthwise on the PCM magnetic record tape. The continuous occurrence of errors widthwise on the PCM magnetic record tape is inherent to splice editing. In the example illustrated it is considered that the occurrence of three successive errors is sufficient to identify a spliced portion of the tape.

Accordingly, the "R-S FLIP-FLOP" circuit 58 is adapted to produce a splice sensing signal d in the form of a rectangular pulse (see waveform d, FIG. 4) in response to that clock pulse c developed immediately after the three consecutive error check pulses a have indicated the occurrence of errors. This splice sensing signal d is delivered to the output 60 for the purpose of preventing erroneous pulses a from being written in the memory 30. The splice sensing signal d terminates upon receipt of that clock pulse c occurring immediately following the receipt of three consecutive error check pulses which indicate that no error occurs after the last one of the consecutive error check pulses indicating the occurrence of errors as shown in FIG. 4.

Figure 5:
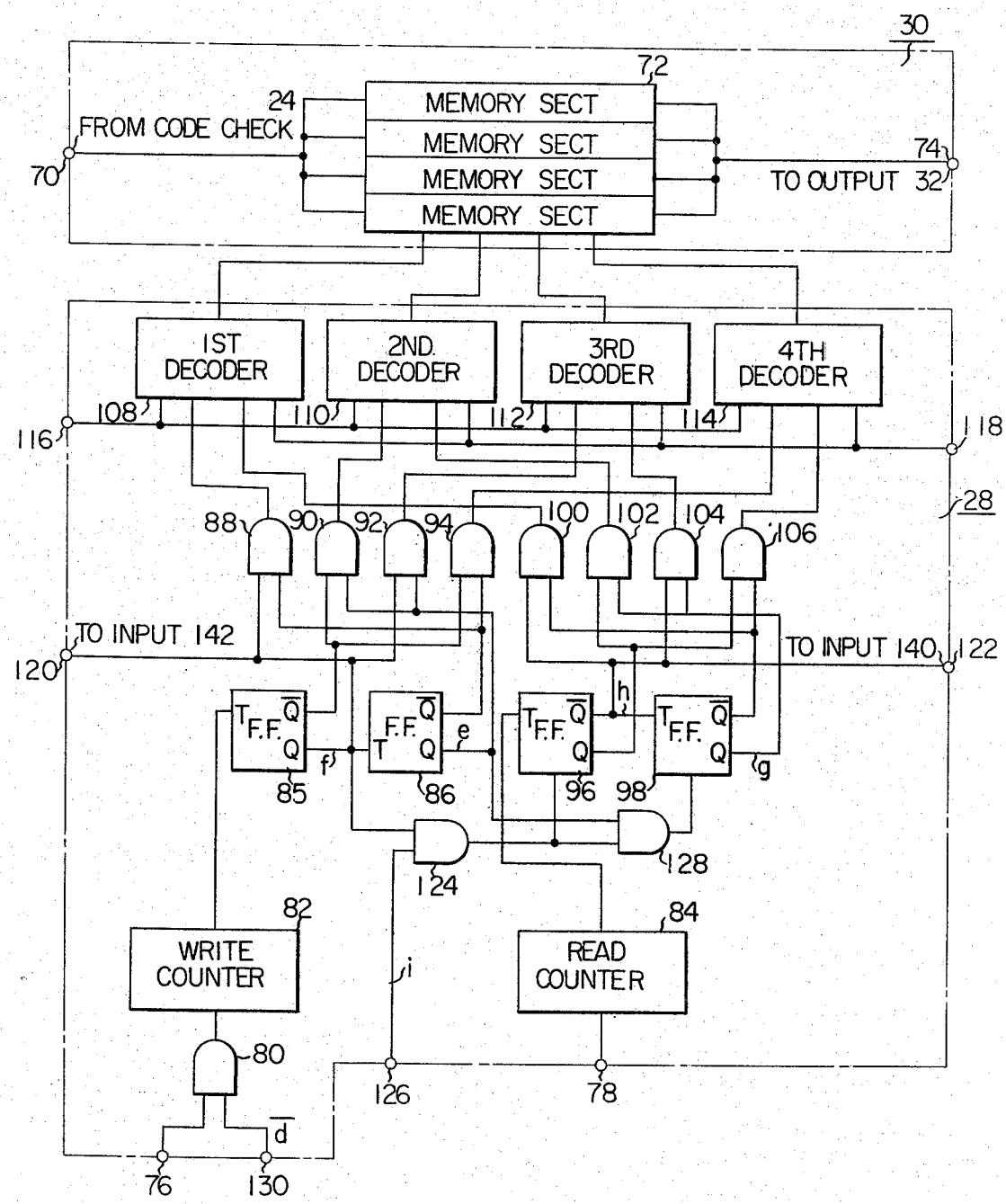
FIG. 5 is a connection circuit diagram of the details of the memory and control circuits shown in FIG. 2.

As shown in FIG. 5, the memory 30 includes an input 70 connected to the code check circuit 24, a plurality of memory sections 72, in this case, four sections arranged in parallel to one another and connected to the input 70 and an output 74 connecting the four memory sections to the output terminal 32 (see FIG. 2).

Figure 6:
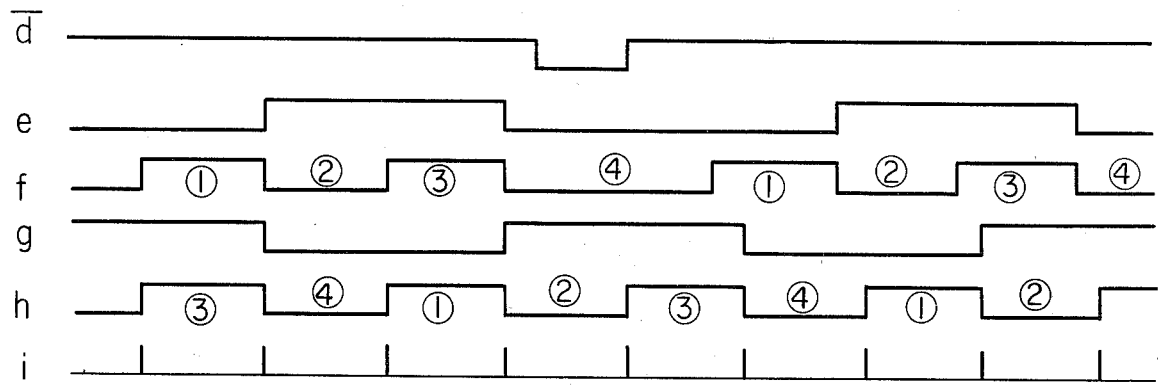
FIG. 6 is a graph illustrating signal waveforms developed at various points in the arrangement shown in FIG. 5.

The control circuit 28 may have the circuit configuration shown in FIG. 5 and may have signal waveforms developed at various points therein as illustrated in FIG. 6. The arrangement illustrated comprises a write input 76 connected to one input of an "AND" gate 80 which has an output connected to a write counter 82 and a read input 78 connected to a read counter 84.

The write counter 82 is connected to an input T of a "T FLIP-FLOP" circuit 85 which has an output Q connected to an input T of another "T FLIP-FLOP" circuit 86. The output Q of the "T FLIP-FLOP" circuit 85 is connected to one input of "AND" gates 88 and 92 while the output $\bar{Q}$ thereof is connected to one input of "AND" gates 90 and 94. The "T FLIP-FLOP" circuit 86 includes an output Q connected to the other inputs to the "AND" gates 90 and 92 and an output $\bar{Q}$ connected to the other inputs to the "AND" gates 88 and 94.

The read counter 84 is connected to a pair of serially connected "T FLIP-FLOP" circuits 96 and 98 which are in turn connected to "AND" gates 100, 102, 104 and 106 in the same manner as above described in conjunction with the write counter 82. The "AND" gates 88 and 100 have their outputs connected to a first decoder 108, and the "AND" gates 90 and 102 have their outputs connected to a second decoder 110. Similarly, the "AND" gates 92 and 104 have their outputs connected to a third decoder 112 and the "AND" gate 94 and 106 have their outputs connected to a fourth decoder 114. All of the decoders 108, 110, 112 and 114 are connected to a separate input 116 to which clock pulses are applied and all of the decoders are also connected to an output 118. The decoders 108, 110, 112 and 114 include further outputs connected to the respective memory sections 72.

A further output 120 is connected to the output Q of the "T FLIP-FLOP" circuit 85 and an output 122 is connected to the output $\bar{Q}$ of the "T FLIP-FLOP" circuit 96 respectively.

The output Q of the "T FLIP-FLOP" circuit 85 is also connected to one input of an "AND" gate 124 which has another input connected to a reset input 126. The output Q of the "T FLIP-FLOP" circuit 86 is further connected to one input of another "AND" gate 128 which has a second input connected to the output of the "AND" gate 124. The output of "AND" gate 124 is connected to the "T FLIP-FLOP" circuit 96 and the output of "AND" gate 128 is connected to the "T FLIP-FLOP" circuit 98.

The write counter 82 counts write frame pulses with a predetermined pulse repetition frequency successively passed through the "AND" circuit 80 up to the amount of data stored in the memory circuit 72. The count on the counter 82 is frequency divided by the "T FLIP-FLOP" circuit 85 to form control gate pulses f (see waveform f, FIG. 6) and further frequency-divided by the "T FLIP-FLOP" circuit 86 to form control gate pulses e (see waveform e, FIG. 6). The "AND" gates 88 through 94 convert those control gate pulses to gating pulses required for writing the data from the code check circuit 24 into the memory circuit 72.

Similarly, read frame pulses successively applied to the read input 78 are counted by the read counter 84 and then converted to control gate pulses g and h (see waveforms g and h, FIG. 6) by the "T FLIP-FLOP" circuits 96 and 98 after which the "AND" gates 100 through 106 produce gating pulses required for reading out the data stored in the memory sections 72. In order to maintain the phase relationship between the control gate pulses e, f and g, h a predetermined constant, reset pulses i with a predetermined pulse repetition frequency (see waveform i, FIG. 7) are applied through the reset input 126 to the "AND" gate 124 which has the control gate pulses f also applied thereto and the output from the "AND" gate 124 is applied to "T FLIP-FLOP" circuit 96 and the output from the "AND" gate 128 is applied to "T FLIP-FLOP" 98 respectively to reset these flip-flops. Thus the phase relationship between the writing and reading processes are maintained.

Under these circumstances, it is assumed that a spliced portion has been sensed by the splice sensor circuit 26 resulting in the generation of a splice sensing pulse $\bar{d}$ (see waveform $\bar{d}$, FIG. 4). Under the assumed conditions, after having been inverted in polarity, the splice sensing signal d from the output 68 (see FIG. 3) is applied, as a pulse $\bar{d}$ (see waveform $\bar{d}$, FIG. 6), to the "AND" gate 80 through a splice signal input 130 so that, when the pulse $\bar{d}$ has a value of binary ZERO, the "AND" gate 80 delivers a null output to the write counter 82. As a result, the corresponding control gate pulses e and f are temporarily extended by the duration of the pulse $\bar{d}$ as shown at waveforms e and f in FIG. 6. However, if this time delay is less than the time required to fill the storage capacity of each memory circuit portion then the signal appearing immediately before the sliced tape portion is smoothly joined with the normal signal developed immediately after the loss.

Assuming that the signal recording speed is of 1 megabits per second, one splice editing results in the loss of 5 kilobits for five milliseconds by leaving a margin of a few milliseconds. With the existing IC memories in mind, it is easily possible to form memory circuit 72 having a storage capacity sufficient to absorb the loss of data on the order of the figure just specified.

Also portions of the waveforms f and h shown in FIG. 6 are labelled with reference numerals 1, 2, 3 and 4 in circles. Those reference numerals also designate the memory sections starting, for example, with the uppermost section as viewed in FIG. 5 and means that each rectangular pulse developed in the waveforms f and h operates to write data into or read data out from that memory section designated by the same reference numeral as the rectangular pulse. For example, the pulse in the waveform f labelled 1 in a circle operates to write data in the memory section designated by the reference numeral 1 while the pulse in the waveform h labelled 3 in a circle operates to read data out from the memory section designated by the reference numeral 3.

It will readily be understood that the arrangement of FIG. 5 is effective for processing a single spliced portion but that the presence of two or three spliced portions may cause a problem in that the memory circuit 72 may become clear. In order to avoid this problem, means are provided for sensing the amount of data stored in the memory sections 72 and for increasing the speed of travel of the PCM magnetic record tape so as to maintain a predetermined constant amount of data stored in the memory circuit 72 when the sensed amount of data falls below a predetermined amount. This permits a plurality of spliced portions to be processed.

Figure 7:
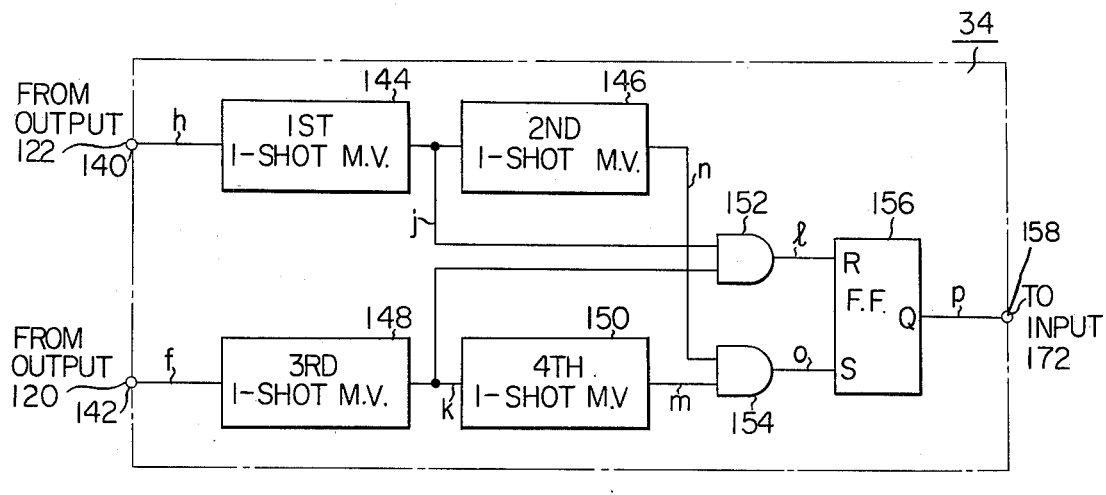
FIG. 7 is a circuit diagram of the amount sensor circuit shown in FIG. 2.
Figure 8:
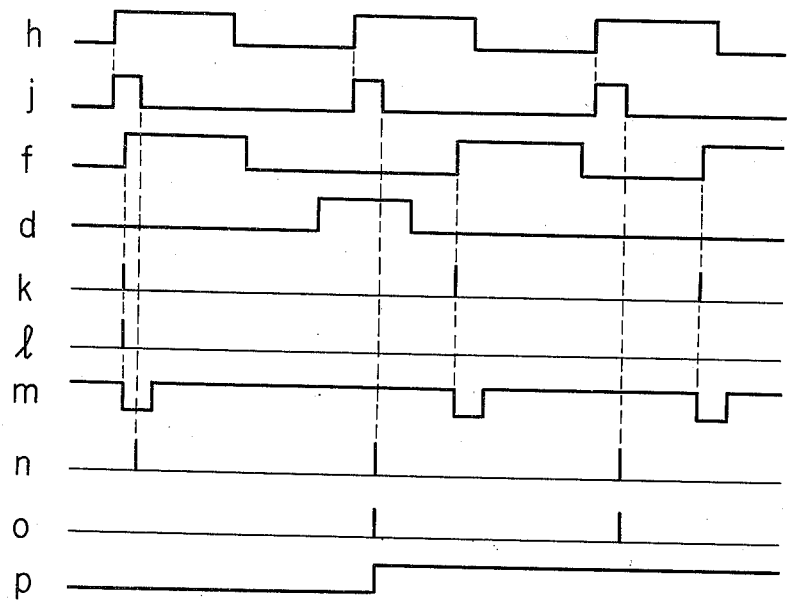
FIG. 8 is a graph illustrating signal waveforms developed at various points in the arrangement shown in FIG. 7.

The amount sensor circuit 34 serving as second sensor means may have the circuit configuration shown in FIG. 7 and have signal waveforms developed at various points therein as shown in FIG. 8. The arrangement illustrated comprises a read input 140 connected to the output 122 (see FIG. 5) and a write input 142 connected to the output 120 (see FIG. 5). The read input 140 is connected to a first one-shot multivibrator 144 which is in turn connected to a second one-shot multivibrator 146. The write input 142 is connected to a third one-shot multivibrator 148 which is in turn connected to a fourth one-shot multivibrator 150. The first one-shot multivibrator 144 and the third one-shot multivibrator 148 are connected to a pair of inputs of an "AND" gate 152 and the second one-shot multivibrator 146 and the fourth one-shot multivibrator 150 are connected to a pair of inputs of another "AND" gate 154. The "AND" gate 152 has an output connected to the input R of an "R-S FLIP-FLOP" circuit 156 that is connected to an output 158. The "AND" gate 154 has an output connected to the input S of "R-S FLIP-FLOP" 156.

In operation, the read control gate h and the write control gate f (see waveforms h and f, FIGS. 6 and 8) enter the read input 140 and write input 142 respectively to actuate the the associated one-shot multivibrators 144 and 148 with their leading edge to produce read gate signal j and write gate signal k (see waveforms j and k, FIG. 8). Those gate signals j and k are applied to the "AND" gate 152 to cause the latter to supply pulses l (see waveform l, FIG. 8) to the reset input R of the "R-S FLIP-FLOP" circuit 156.

Also the second one-shot multivibrator 146 responds to the trailing edge of the control gate signal h and the fourth one-shot multivibrator 150 responds to the trailing edge of the control gate signal f respectively to produce gate pulses n and m (see waveforms n and m, FIG. 8). Those gate pulses m and n pass through the "AND" gate 154 to form output pulses o (see waveform o, FIG. 8) which is, in turn, applied to the set input S of the "R-S FLIP-FLOP" circuit 156.

Assuming that a splice sensing signal d (which is also shown at waveform d, in FIG. 8) is produced, the corresponding write control gate pulse f is extended by the duration of the period the pulse d and has a value of binary ONE as shown at waveform f in FIG. 8. This causes the read gate pulses j and m to shift in phase from the write gate pulses r and n respectively resulting in the generation of the set pulse o.

In this way the phase shift between the write control gate pulse f and read control gate pulse h is sensed to thereby sense the amount of data stored in the memory 30. The "R-S FLIP-FLOP" circuit 156 is responsive to the set pulse o to deliver a speed control signal p (see waveform p, FIG. 8) to the output 158.

Then this speed control signal p is used to control the speed of travel of the PCM magnetic record tape. The tape speed control is accomplished by adjusting the speed of rotation of the capstan (not shown) employed in accordance with the phase difference between servo pulses resulting from the tape and a reference signal produced by an associated local quartz crystal oscillator. It is necessary that the speed of travel of the tape can vary by changing the frequency of the reference signal. For restoration, the reference signal should increase in memory frequency while the particular capstan servo mechanism (not shown) is maintained in a phase locked state.

Figure 9:
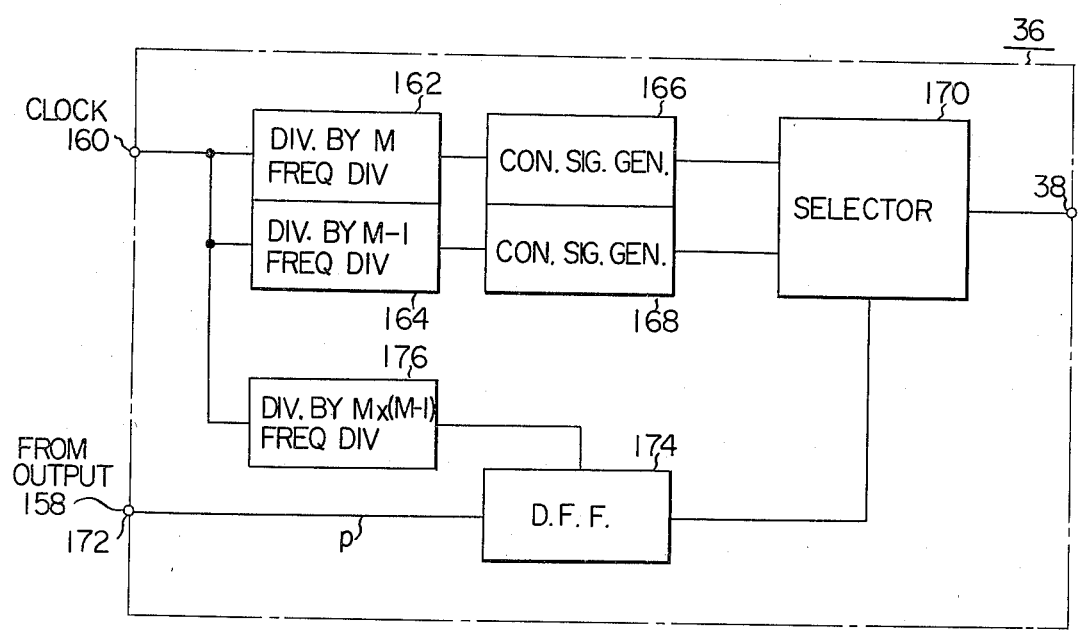
FIG. 9 is a circuit diagram of the details of the speed control signal generator circuit shown in FIG. 2.

In order to change the control signals resulting from the train of clock pulses, the speed control signal generator circuit 36 serving as a control means may have the circuit configuration shown in FIG. 9. The arrangement illustrated comprises a clock input 160 connected to both a divide-by-M frequency divider 162 and a divide-by-(M−1) frequency divider 164 which are connected to respective control signal generator circuits 166 and 168. Those control signal generator circuits 166 and 168 are then connected to a selector circuit 170 which is, in turn, connected to the control output 38 (see also FIG. 2).

The arrangement further comprises a control input 172 receiving the speed control signal p from the output 158 (see FIG. 7) and connected to a "D FLIP-FLOP"

circuit 174 to which the clock input 160 is connected through a divide-by Mx(M−1) frequency divider 176.

The clock pulses entering the clock input 160 are frequency divided by both frequency dividers 162 and 164 and are then converted to two types of control signal by the control signal generator circuits 166 and 168 respectively. On the other hand, the speed control signal p applied to the control input 172 is synchronized with clock pulses from the divide by Mx(M−1) frequency divider 176 by means of the "D FLIP-FLOP" circuit 174 after which the synchronized signal from the "D FLIP-FLOP" circuit 74 is delivered to the selector circuit 170. The selector circuit 170 selects the output from the control signal generator circuit 166 when the synchronized signal from the "D FLIP-FLOP" circuit has a value of binary ZERO and also selects the output from the control signal generator circuit 168 when the synchronized signal has a valve of binary ONE to produce a speed control signal for the speed of the PCM magnetic record tape. The speed control signal thus produced is supplied via the output terminal 38 to a speed control circuit (not shown) to control the speed of travel of the PCM magnetic record tape.

The present invention exhibits the effect that the memory smooths the noise from the loss of data resulting from the splice editing of an associated magnetic record tape to thereby provide a continuous output signal.

While the present invention has been illustrated and described in conjunction with a single preferred embodiment thereof it is to be understood that numerous changes and modifications may be resorted to without departing from the spirit and scope of the present invention.

What we claim is:

1. An improvement in a PCM recording and reproducing system having a PCM converter means for converting an analog signal into a pulse code modulated signal, a PCM record medium having a plurality of record tracks disposed thereon, a recording means for recording the pulse code modulated signal on the plurality of record tracks of the PCM record medium in a predetermined pattern and a reproducing means for reproducing the pulse code modulated signal recorded on the PCM record medium, said improvement comprising:

a memory means in said reproducing system having a predetermined storage capacity for storing data therein;

a writing means connected to said memory means and having the reproduced pulse code modulated signal applied thereto, for continuously storing the reproduced pulse code modulated signal in said memory means;

a reading means connected to said memory means for continuously reading the data stored in said memory means after a time delay from the time said data was stored in said memory means;

a splice sensing means for sensing errors in the patterns in adjacent positions in a plurality of adjacent tracks in the direction transverse to the tracks and thereupon indicating the presence of a splice in the PCM record medium; and a writing suspension means connected to said writing means and said splice sensing means for suspending the writing of the pulse code modulated signal in said memory means upon generation of said splice signal.

2. An improvement in a PCM recording and reproducing system having a PCM converter means for converting an analog signal into a pulse code modulated signal, a PCM record medium having a plurality of record tracks disposed thereon, a recording means for recording the pulse code modulated signal on the plurality of record tracks of the PCM record medium in a predetermined pattern and a reproducing means for reproducing the pulse code modulated signal recorded on the PCM record medium, said improvement comprising:

a memory means having a predetermined storage capacity for storing data therein;

a writing means connected to said memory means and having the reproduced pulse code modulated signal applied thereto, for continuously storing the reproduced pulse code modulated signal in said memory means;

a reading means connected to said memory means for continuously reading the data stored in said memory means a time delay after said data was stored in said memory means;

a splice sensing means for generating a splice signal upon detection of a splice in the PCM record medium;

a writing suspension means connected to said writing means and said splice sensing means for suspending the writing of the pulse code modulated signal in said memory means upon generation of said splice signal; and a writing speed control means connected to said memory means and said writing means for increasing the speed of storing the reproduced pulse code modulated signal in said memory means for a predetermined period of time when the amount of data stored in said memory means decreases below a predetermined amount.

3. An improvement in a PCM recording and reproducing system having a PCM converter means for converting an analog signal into a pulse code modulated signal, a PCM record medium having a plurality of record tracks disposed thereon, a recording means for recording the pulse code modulated signal on the plurality of record tracks of the PCM record medium in a predetermined pattern and a reproducing means for reproducing the pulse code modulated signal recorded on the PCM record medium, said improvement comprising:

a memory means having a predetermined storage capacity for storing data therein;

a writing means connected to said memory means and having the reproduced pulse code modulated signal applied thereto, for continuously storing the reproduced pulse code modulated signal in said memory means;

a reading means connected to said memory means for continuously reading the data stored in said memory means a time delay after said data was stored in said memory means;

a splice sensing means for generating a splice signal upon detection of a splice in the PCM record medium;

a writing suspension means connected to said writing means and said splice sensing means for suspending the writing of the pulse code modulated signal in said memory means upon generation of said splice signal;

a data amount sensor connected to said memory means and said splice sensor for generating a data amount signal indicative of the amount of data stored in said memory means upon generation of said splice signal; and a speed control means connected to said data amount sensor for controlling the speed of travel of the PCM record medium to set the amount of data stored in said memory means at a predetermined constant amount.

4. An improvement in a PCM recording and reproducing system as claimed in claim 3 wherein:

said writing means includes means for generating a writing control signal for controlling the rate of storing the reproduced pulse code modulated signal in said memory means and includes a gate means for suspending said writing control signal during the generation of said splice signal;

said reading means includes means for generating a reading control signal for controlling the rate of reading said data stored in said memory means; and said data amount sensor is connected to said writing means and said reading means and includes means for generating a signal indicative of the phase shift between said writing control signal and said reading control signal, said signal indicative of the phase shift being said data amount signal.

5. An improvement in a PCM recording and reproducing system as claimed in claim 3, wherein said speed control means comprises;

a clock signal generating means for generating a series of clock pulses;

a first frequency divider connected to said clock signal generating means for generating a series of pulses having a frequency equal to the frequency of said series of clock pulses divided by M, where M is a predetermined constant;

a second frequency divider connected to said clock signal generating means for generating a series of pulses having a frequency equal to the frequency of said series of clock pulses divided by $M-1$;

first and second speed control signal generation means respectively connected to said first and second frequency dividers, said first and second speed control signal generators for generation of respective first and second speed control signals dependant on the frequency of the series of pulses applied thereto;

a third frequency divider connected to said clock signal generating means for generating a series of pulses having a frequency equal to the frequency of said series of clock pulses divided by $M \times (M-1)$;

a D flip-flop having an input connected to said data amount sensor, a clock terminal connected to said third frequency divider and an output, for generating a first output signal upon receipt of the first pulse of said series of pulses from said third frequency divider after said data amount signal indicates said data stored in said memory means is less than a predetermined amount and for generating a second output signal upon receipt of the first pulse of said series of pulses from said third frequency divider after said data amount signal indicates said data stored in said memory means is greater than said predetermined amount; and a selector circuit having first and second inputs respectively connected to said first and second speed control signal generation means, a control input connected to said D flip-flop circuit and an output, for supplying said first speed control signal to said output when said D flip-flop generates said first output signal and for supplying said second speed control signal to said output when said D flip-flop generates said second output signal.

6. An improvement in a PCM recording and reproducing system having a PCM converter means for converting an analog signal into a pulse code modulated signal, a PCM record medium having a plurality of record tracks disposed thereon, a recording means for recording the pulse code modulated signal on the plurality of record tracks of the PCM record medium in a predetermined pattern and a reproducing means for reproducing the pulse code modulated signal recorded on the PCM record medium, said improvement comprising:

a memory means having a predetermined storage capacity for storing data therein;

a writing means connected to said memory means and having the reproduced pulse code modulated signal applied thereto, for continuously storing the reproduced pulse code modulated signal in said memory means;

a reading means connected to said memory means for continuously reading the data stored in said memory means a time delay after said data was stored in said memory means;

a splice sensing means for generating a splice signal upon detection of a splice in the PCM record medium; and a writing suspension means connected to said writing means and said splice sensing means for suspending the writing of the pulse code modulated signal in said memory means upon generation of said splice signal;

said splice sensing means comprising: an error code check circuit having the reproduced pulse code modulated signal applied thereto for generating an error check signal for each frame of the reproduced pulse code modulated signal when a comparison of the data bits and the check bits of that frame indicates the probability of an error in the data bits of that frame is low;

a first clock pulse generating means for generating a first series of clock pulses having the same repetition period as said error check signal;

a plurality of flip-flop circuits, each having an input, an output and a clock terminal, said input of a first flip-flop having said error check signals applied thereto, said output of each flip-flop circuit connected to said input of a next succeeding flip-flop circuit, each of said clock terminals of said plurality of flip-flop circuit having said first series of clock pulses applied thereto, said plurality of flip-flop circuits for delaying said error check signals in an incremental manner;

a second clock pulse generating means for generating a second series of clock pulses having the same repetition period as said first series of clock pulses and having a phase 180° different from the phase of said first series of clock pulses;

an AND gate having a plurality of inputs, said flip-flop circuit outputs and said second series of clock pulses applied to respective inputs; and a R-S flip-flop circuit having a reset input connected to said AND gate and a set input connected to said NOR gate for generating said splice signal when set and not generating said splice signal when reset.

7. An improvement in a PCM recording and reproducing system having a PCM converter means for converting an analog signal into a pulse code modulated signal, a PCM record medium having a plurality of record tracks disposed thereon, a recording means for recording the pulse code modulated signal on the plurality of record tracks of the PCM record medium in a predetermined pattern and a reproducing means for reproducing the pulse code modulated signal recorded on the PCM record medium, said improvement comprising:

a memory means having a predetermined storage capacity for storing data therein;

a writing means connected to said memory means and having the reproduced pulse code modulated signal applied thereto, for continuously storing the reproduced pulse code modulated signal in said memory means;

a reading means connected to said memory means for continuously reading the data stored in said memory means a time delay after said data was stored in said memory means;

a splice sensing means for generating a splice signal upon detection of a splice in the PCM record medium;

a writing suspension means connected to said writing means and said splice sensing means for suspending the writing of the pulse code modulated signal in said memory means upon generation of said splice signal; and a control circuit means connected to said writing means having a writing counter circuit for determining the addresses for storage of the reproduced pulse code modulated signal in said memory means, and a gate means connected to said writing counter circuit and said splice sensing means for preventing change of said address determined by said writing counter circuit upon generation of said splice signal.

* * * * *